(12) United States Patent
Monsen

(10) Patent No.: US 10,038,573 B2
(45) Date of Patent: Jul. 31, 2018

(54) APPARATUS AND METHODS FOR ADAPTIVE DATA RATE COMMUNICATION IN A FORWARD-SCATTER RADIO SYSTEM

(71) Applicant: Comtech Systems Inc., Orlando, FL (US)

(72) Inventor: Peter Monsen, Stowe, VT (US)

(73) Assignee: Comtech Systems Inc., Orlando, FL (US)

( * ) Notice: Subject to any disclaimer, the term of this patent is extended or adjusted under 35 U.S.C. 154(b) by 0 days.

(21) Appl. No.: 15/602,588

(22) Filed: May 23, 2017

(65) Prior Publication Data

US 2017/0338978 A1 Nov. 23, 2017

Related U.S. Application Data

(60) Provisional application No. 62/340,173, filed on May 23, 2016.

(51) Int. Cl.
*H04L 25/03* (2006.01)
*H04L 25/02* (2006.01)
*H04L 5/00* (2006.01)
*H04L 1/00* (2006.01)

(52) U.S. Cl.
CPC ...... *H04L 25/03019* (2013.01); *H04L 1/0041* (2013.01); *H04L 1/0045* (2013.01); *H04L 1/0058* (2013.01); *H04L 5/0048* (2013.01); *H04L 25/025* (2013.01)

(58) Field of Classification Search
CPC ............. H04L 25/03019; H04L 25/025; H04L 1/0058; H04L 1/0041; H04L 1/0045; H04L 5/0048
See application file for complete search history.

(56) References Cited

U.S. PATENT DOCUMENTS

| 4,112,370 A | 9/1978 | Monsen |
| 4,631,734 A | 12/1986 | Foschini |
| 2002/0154705 A1* | 10/2002 | Walton ................ H04B 7/0417 375/267 |
| 2007/0147251 A1* | 6/2007 | Monsen ............... H04B 7/0632 370/235 |

(Continued)

OTHER PUBLICATIONS

P. Monsen, "Tropospheric Scatter Communication," Wiley Encyclopedia of Telecommunications, Apr. 2003.
(Continued)

*Primary Examiner* — Syed Haider
(74) *Attorney, Agent, or Firm* — Burns & Levinson, LLP; Richard B. Emmons

(57) ABSTRACT

A transmitter/receiver apparatus and method provide adaptive data rate fading compensation that utilize dual-polarization transmissions at a constant modulation-symbol rate over a forward-scatter radio link and that employ adaptive receiver techniques that operate efficiently at the noisy uncoded signal-to-noise ratio threshold of present-day forward-error correction codes over the range of multipath widths in such forward-scatter environments. The dual-polarization transmissions support both dual transmission and dual diversity configurations. The adaptive receiver techniques include adaptive channel matched filtering and adaptive equalizing at the modulation-symbol rate.

9 Claims, 6 Drawing Sheets

(56) References Cited

U.S. PATENT DOCUMENTS

2009/0316802 A1* 12/2009 Tong .................. H04B 7/0452
                                                                                  375/260

OTHER PUBLICATIONS

P. Monsen, "Feedback Equalization for Fading Dispersive Channels," IEEE Trans. on Information Theory, Jan. 1971, pp. 56-64.

C. J. Grzenda et al., "Megabit Digital Troposcatter Subsystem," NTC Conference Record, Dec. 1975, pp. 28-15 to 28-19.

M. Person, "Radyne Troposcatter Modem Used in First Ku Band Link," Jun. 16, 2006, http://www.prnewswire.com/news-releases/radyne-troposcatter-modem-used-in-first-ku-band-link-56183227.html [retrieved on May 23, 2017].

A. Giordano et al., "Least Square Estimation with Application to Digital Signal Processing," 1985, Chapter 3.3, pp. 58-63.

J. Chisholm et al., "Investigations of Angular Scattering and Multipath Properties of Tropospheric Propagation of Short Radio Waves Beyond the Horizon," Proc. IRE, v. 43, 1955, pp. 1317-1335.

M. Schwartz et al., "Communication Systems and Techniques," 1966, pp. 423-424.

D. Falconer et al., "Broadband Wireless Using Single Carrier and Frequency Domain Equalization," WPMC 2002, Oct. 2002.

A. Falconer et al., "Frequency Domain Equalization for Single-Carrier Broadband Wireless System," IEEE Communications Magazine, Apr. 2002.

* cited by examiner

APPARATUS AND METHODS FOR ADAPTIVE DATA RATE COMMUNICATION IN A FORWARD-SCATTER RADIO SYSTEM

CROSS-REFERENCE TO RELATED APPLICATION

This Application claims the benefit of U.S. Provisional Application 62/340,173 filed on May 23, 2016, the entire contents of which are incorporated herein by reference.

FIELD OF INVENTION

The present invention relates to adaptive data rate communication in a radio system that includes fading channels that are dispersive in both time and frequency due to a forward scattering effect that results in a weak depolarization of orthogonal polarization transmissions. More particularly, the invention relates to improvements in such communication in which transmitted digital signals associated with orthogonal polarized transmissions are used for adaptive data rate communication modes and channel estimation and equalization are used to demodulate received signals to produce estimates of the transmitted digital signals and to estimate parameters of the fading channels that are required for the adaptive data rate communication.

BACKGROUND OF THE INVENTION

Data communication in systems where channel conditions include time varying reflections and/or scattering of the transmitted signal wave is generally more difficult than in systems where a time-invariant signal path exists between the transmitter and the receiver. Fading results when multiple paths from random reflections and/or scattering combine to cancel much of the transmitted signal. Cellular radio systems such as 4G Long-Term Evolution (LTE) and the wireless local area network (WLAN) WiFi (802.11 IEEE Standard) radio system are examples where the fading is largely from reflections. In a forward-scatter radio system the fading results from scattering over small angles, on the order of the antenna beamwidth in the forward direction. A tropospheric-scatter radio link exploits inhomogeneities in the troposphere resulting in forward-scattered signals that can be received at distances beyond the radio horizon. Tropospheric-scatter radio systems may include multiple duplex links for purposes of providing digital data trunks containing digitized voice data and digital data including computer data and Internet traffic. These digital tropospheric-scatter systems are used in commercial applications, for example, for providing communication for oil drilling platforms at sea, and in military applications in both tactical and strategic configurations. Although many digital tropospheric scatter systems were replaced by satellite technology in the 80's and 90's, the utility of rapid deployment of tactical systems and the cost and availability of satellite lease service are factors contributing to the continuing use of digital tropospheric scatter systems.

Prior art techniques have been used to provide adaptive equalization for signal demodulation and compensation for fading with adaptive data rate techniques; however, there is a need in the art for tropospheric-scatter radio systems that provide a transmitter/receiver that employs adaptive data rate fading compensation, covers the large range of delay spread with a large equalization span, considers the use of orthogonal-polarization transmissions, is efficient at low signal-to-noise ratios with higher-order signal constellations, and uses data rate throughput and packet BER as criteria. This need further includes signal demodulation in multiple-transmission applications with acceptable complexity and satisfactory mutual interference cancellation.

SUMMARY OF THE INVENTION

Figure 1:
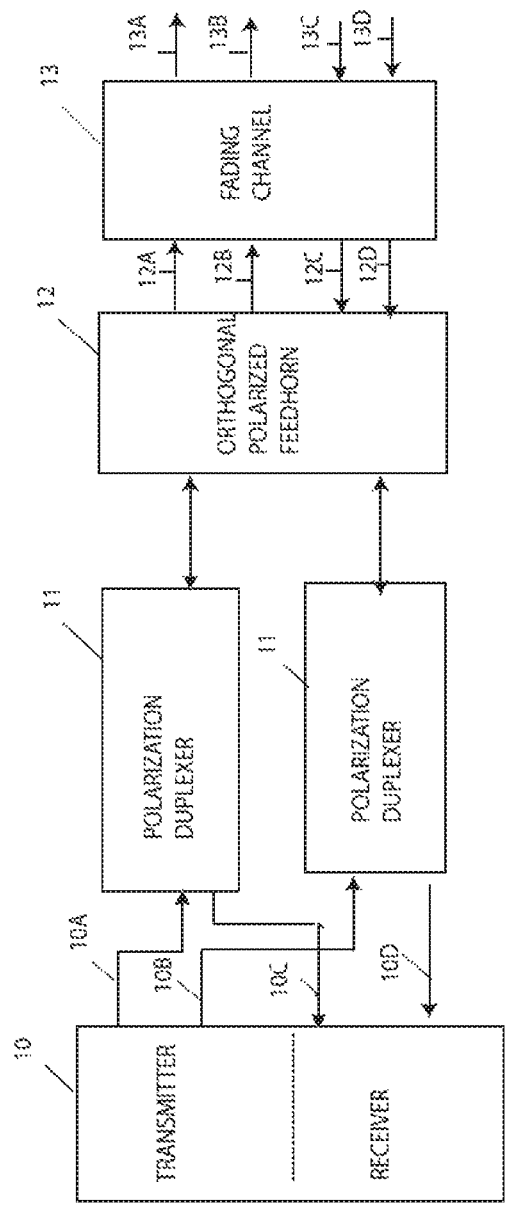
FIG. 1 is a block diagram of a transmitter/receiver with orthogonally-polarized transmission and reception in an exemplary fading channel application.

It is an object of the invention to provide adaptive data rate fading compensation that utilize dual-polarization transmissions over a forward-scatter radio link and to employ adaptive receiver techniques that operate efficiently at the noisy uncoded signal-to-noise ratio threshold of present-day forward-error correction codes over the range of multipath widths in such forward-scatter environments. This object and others of the invention are realized by providing a transmitter/receiver apparatus and method for use in an adaptive-data rate communication system that includes a remote radio terminal that communicates with a transmitter/receiver apparatus at a local terminal. At the transmitter of the transmitter/receiver there are data sources for generating one or two forward-error corrected coded data signals for transmission in one or more transmission modes with variable code rates and modulation orders, wherein the one or more transmission modes are selected from the group consisting of at least dual transmission of two independent coded data signals and at least diversity transmission of one coded data signal, and the one or more transmission modes are chosen by a set of measured parameters that includes a quality measure provided by communications feedback from a remote radio terminal. Each coded data signal in a constellation modulator and framer is multiplexed at a modulation-symbol rate with an associated reference signal to produce a reference subframe and one or more data subframes and subsequently constellation modulated to produce one or more transmission frame signals. In the dual transmission mode, the one or more transmission frame signals are converted into two independent transmission signals by a radio transmission interface, while in the diversity mode the one or more transmission frame signals are converted into two identical transmission signals by the radio transmission interface. The resulting two transmission signals (e.g., two independent or two identical, respectively) may be used for radio transmission from orthogonally-polarized antenna ports over a forward-scatter fading channel. At the receiver of the transmitter/receiver a radio reception interface converts two remote-link received radio signals each associated with an orthogonal-polarized antenna port into polarization-port received signals at an integer multiple, greater than one, of the modulation-symbol rate to provide polarization-port received samples within a reference subframe and within the one or more data subframes. A channel estimator calculates, in the reference subframe, a polarization port matched-channel filter, which results from a set of equations derived by a Least-Means Squared Error optimization that may generally depend on an orthonormal vector of basis functions, the respective reference signal, and the respective polarization-port received samples. In a channel matched filter the polarization-port received samples and the respective matched-channel filter are convolved to provide channel-matched samples that are subsequently down-sampled by the integer multiple to produce channel-matched symbols. An equalizer calculator computes, in the reference subframe, an equalizer weight vector, which results from a set of equations derived by a Least-Means Squared Error optimization that depends on an orthonormal vector of basis functions, the respective reference signal, and the channel-matched symbols. An equalizer processes the equalizer weight vector and the channel-matched symbols to produce equalizer estimates of a forward-error corrected coded data signal sent from the remote radio terminal. A quality estimator computes from the equalizer estimates a quality measure, that is related to signal-to-noise ratio, and the quality measure is provided to the transmitter for communications feedback to the remote terminal.

The objects of the invention are further realized by using identical data sources in the transmitter/receiver for transmission in a set of dual-diversity modes with variable code rates and modulation orders and the choice of mode is determined in the adaptive-data rate communication system by a set of measured parameters that includes a quality measure provided by communications feedback from the remote radio terminal. In one aspect, the disclosure provides a transmitter/receiver apparatus that includes a transmitter and a receiver. The transmitter may include:

data sources for generating one or two forward-error corrected coded data signals for transmission in one or more transmission modes with variable code rates and modulation orders, where the one or more transmission modes are selected from the group consisting of dual transmission of two independent coded data signals, diversity transmission of one coded data signal, and combinations thereof, and where the one or more transmission modes are chosen based on one or more measured parameters;

a constellation modulator and framer, operating at a modulation-symbol rate, for multiplexing each coded data signal with an associated reference signal to produce one or more reference subframes and one or more data subframes and constellation modulating the reference and data subframes to produce one or more transmission frame signals;

a radio transmission interface that in the dual transmission mode converts the one or more transmission frame signals into two independent transmission signals and in the diversity mode converts the one or more transmission frame signals into two identical transmission signals, where the two transmission signals are used for radio transmission from orthogonally-polarized antenna ports over a forward-scatter fading channel; and The receiver may include:

a radio reception interface that converts two remote-link received radio signals each associated with an orthogonal-polarized antenna port into polarization-port received signals at an integer multiple, greater than one, of the modulation-symbol rate to provide polarization-port received samples within a reference subframe and within the one or more data subframes;

a channel estimator for calculating, in the reference subframe, a polarization port matched-channel filter, which results from a set of equations derived by a Least-Means Squared Error optimization that depends on an orthonormal vector of basis functions, the respective reference signal, and the respective polarization-port received samples;

a channel matched filter for convolving the polarization-port received samples and the respective matched-channel filter to provide channel-matched samples:

a down-sampler for down-sampling the channel-matched samples by the integer multiple to produce channel-matched symbols;

an equalizer calculator for computing, in the reference subframe, an equalizer weight vector, which results from a set of equations derived by a Least-Means Squared Error optimization that depends on an orthonormal vector of basis functions, the respective reference signal, and the channel-matched symbols;

an equalizer for processing the equalizer weight vector and the channel-matched symbols to produce equalizer estimates of a forward-error corrected coded data signal sent from the remote radio terminal; and a quality estimator for computing from the equalizer estimates a quality measure, that is related to signal-to-noise ratio, and the quality measure is provided to the transmitter for communications feedback to the remote terminal.

In an exemplary embodiment, the transmitter/receiver apparatus may use measured parameters selected from the group consisting of a quality measure provided by communications feedback from a remote radio terminal, a polarization correlation value, a multipath channel width that are calculated in the channel estimator, and combinations thereof.

In an exemplary embodiment, the transmitter/receiver apparatus may utilize basis functions in the channel estimator that are fast-Fourier transforms of elements of a tapped-delay line filter with tap spacing equal to the period of the reciprocal of the integer multiple of the modulation-symbol rate.

In an exemplary embodiment, the transmitter/receiver apparatus may utilize an equalizer calculator that computes an outer-product matrix of the channel matched symbols.

In another aspect, the disclosure provides a communication method that may include a process of source generating, at a transmitter, two forward-error corrected coded data signals for transmission in one or more transmission modes with variable code rates and modulation orders, where the one or more transmission modes are selected from the group consisting of dual transmission of two independent coded data signals, diversity transmission of one coded data signal, and combinations thereof, where the one or more transmission modes are chosen based on one or more measured parameters; constellation modulating and framing at a modulation-symbol rate, at the transmitter, to multiplex each coded data signal with an associated reference signal to produce one or more reference subframes and one or more data subframes and constellation modulating the reference and data subframes to produce one or more transmission frame signals; radio transmission converting, at a transmitter, the one or more transmission frame signals in the dual transmission mode into two independent transmission signals and the one or more transmission frame signals in the diversity mode into two identical transmission signals, and transmitting the two transmission signals from orthogonally-polarized antenna ports over a forward-scatter fading channel;

radio reception converting, at a receiver, two remote-link received radio signals each associated with an orthogonal-polarized antenna port into polarization-port received signals to provide polarization-port received samples within a reference subframe and within the one or more data subframes; channel estimating, at the receiver, in the reference subframe, a polarization-port matched-channel filter, which results from a set of equations derived by a Least-Means Squared Error optimization that depends on an orthonormal vector of basis functions, the respective reference signal, and the respective polarization-port received samples; convolving, at the receiver, the polarization-port received samples with the respective polarization-port matched-channel filter to provide channel-matched samples; down-sampling, at the receiver, the channel-matched samples to produce channel-matched symbols; equalizer calculating, at the receiver, in the reference subframe, an equalizer weight vector, which results from a set of equations derived by a Least-Means Squared Error optimization that depends on an orthonormal vector of basis functions, the respective reference data, and the channel-matched symbols; processing, at the receiver, the equalizer weight vector and the channel-matched symbols to produce equalizer estimates of a forward-error corrected coded data signal sent from the remote radio terminal; quality estimating, at the receiver, a quality measure related to signal-to-noise ratio from the equalizer estimates and providing the quality measure to the transmitter for communications feedback to the remote terminal.

In an exemplary embodiment, the one or more measured parameters are selected from the group consisting of a quality measure provided by communications feedback from a remote radio terminal, a polarization correlation value, a multipath channel width that are calculated in the channel estimator, and combinations thereof.

In an exemplary embodiment, the basis functions in the channel estimating step are fast-Fourier transforms of elements of a tapped-delay line filter with tap spacing equal to the period of the reciprocal of the integer multiple of the modulation-symbol rate.

In an exemplary embodiment, the equalizer calculating step further includes computing an outer-product matrix of the demodulated symbols.

In one aspect, the disclosure provides an apparatus having a transmitter that may include:

data sources for generating one or two forward-error corrected coded data signals for transmission in one or more transmission modes with variable code rates and modulation orders, wherein the one or more transmission modes are selected from the group consisting of dual transmission of two independent coded data signals, diversity transmission of one coded data signal, and combinations thereof, wherein the one or more transmission modes are chosen based on one or more measured parameters;

a constellation modulator and framer, operating at a modulation-symbol rate, for multiplexing each coded data signal with an associated reference signal to produce one or more reference subframes and one or more data subframes and constellation modulating the reference and data subframes to produce one or more transmission frame signals; and a radio transmission interface that in the dual transmission mode converts the one or more transmission frame signals into two independent transmission signals and in the diversity mode converts the one or more transmission frame signals into two identical transmission signals, wherein the two transmission signals are used for radio transmission from orthogonally-polarized antenna ports over a forward-scatter fading channel.

In an exemplary embodiment, the apparatus may further have a receiver that may include:

a radio reception interface that converts two remote-link received radio signals each associated with an orthogonal-polarized antenna port into polarization-port received signals at an integer multiple, greater than one, of the modulation-symbol rate to provide polarization-port received samples within a reference subframe and within the one or more data subframes;

a channel estimator for calculating, in the reference subframe, a polarization port matched-channel filter, which results from a set of equations derived by a Least-Means Squared Error optimization that depends on an orthonormal vector of basis functions, the respective reference signal, and the respective polarization-port received samples;

a channel matched filter for convolving the polarization-port received samples and the respective matched-channel filter to provide channel-matched samples;

a down-sampler for down-sampling the channel-matched samples by the integer multiple to produce channel-matched symbols;

an equalizer calculator for computing, in the reference subframe, an equalizer weight vector, which results from a set of equations derived by a Least-Means Squared Error optimization that depends on an orthonormal vector of basis functions, the respective reference signal, and the channel-matched symbols;

an equalizer for processing the equalizer weight vector and the channel-matched symbols to produce equalizer estimates of a forward-error corrected coded data signal sent from the remote radio terminal; and a quality estimator for computing from the equalizer estimates a quality measure, that is related to signal-to-noise ratio, and the quality measure is provided to the transmitter for communications feedback to the remote terminal.

In an exemplary embodiment, the receiver may be located in a housing unit that is separate from the transmitter, and the receiver may be coupled to the transmitter via a bi-directional data link.

DETAILED DESCRIPTION OF THE INVENTION

As noted above, a tropospheric-scatter radio link exploits inhomogeneities in the troposphere resulting in forward-scattered signals that can be received at distances beyond the radio horizon. Tropospheric-scatter radio systems may include multiple duplex links for purposes of providing digital data trunks containing digitized voice data and digital data including computer data and Internet traffic. These digital tropospheric-scatter systems are used in commercial applications, for example, for providing communication for oil drilling platforms at sea, and in military applications in both tactical and strategic configurations. Although many digital tropospheric scatter systems were replaced by satellite technology in the 80's and 90's, the utility of rapid deployment of tactical systems and the cost and availability of satellite lease service are factors contributing to the continuing use of digital tropospheric scatter systems. Tropospheric Scatter Communications by P. Monsen in Wiley Encyclopedia of Telecommunications, John Wiley & Sons, New York, N.Y., provides a summary and implementation considerations for this radio system technique.

The weak signal-to-noise ratio conditions that result from fading are compensated for with additional redundant, i.e., diversity, paths. For example, diversity is achieved with redundant paths through the tropospheric scattering volume by providing multiple antennas (space diversity) or multiple antenna feedhorns (angle diversity). Required antenna separation in space diversity systems for uncorrelated diversity channels is tens of wavelengths. An angle diversity system typically would use two vertically configured cross-polarized feedhorns with minimum beam separation. Because of design constraints this beam separation is typically about one beamwidth. On shorter paths, angle diversity provides no improvement because the larger scattering angle for the elevated beam has too much loss. Frequency diversity is achieved with redundant paths provided by additional signal bands that are spaced in frequency but contain the same transmitted signal information. Frequency separation must be greater than a coherence bandwidth that is inversely proportional to the delay spread. Polarization diversity is realized by transmitting the same signals on orthogonal polarizations. The weak depolarization of orthogonal polarization transmissions in forward-scatter systems results in decorrelated signals that provide the diversity improvement. However, the correlation coefficient in these systems are close to unity so polarization diversity is not as effective as space and frequency diversity systems where the correlation coefficients are zero. These diversity techniques are denoted as explicit because they are purposely included in the radio system design.

A fading channel is said to be dispersive in frequency if the fading is not constant over the signal band of interest. A frequency-dispersive channel when excited by an impulse function in time produces multipath-delayed received signals spread out in the delay dimension. The average power of these multipath delayed signals versus delay represents the multipath profile of the frequency dispersive channel. The standard deviation $\sigma_d$, i.e. rms delay spread, of the multipath profile is a measure of the multipath delay width. Multiplying by the signal bandwidth B, the normalized delay spread is defined by $s=\sigma_d B$. When the normalized delay spread is a significant fraction of unity, redundant multipath returns occur within the received signal bandwidth that can be combined with an adaptive signal processor to produce a diversity effect that is termed implicit diversity in order to differentiate this diversity from the explicit diversity techniques described above. Typical values of the rms delay spread in tropospheric scatter radio systems vary from 10 to 100 nanoseconds for shorter links on the order of 100 km and from 20 to 200 nanoseconds for longer links on the order of 300 km. System bandwidths in these systems are on the order of 30 MHz, resulting in a large range of normalized delay spread from 0.3 to 6.0.

A fading channel is said to be dispersive in time if the fading characteristic is time-varying. A time-dispersive channel when excited by a sinusoid produces multiple received signals spread out in the frequency dimension. Analogous to the rms delay spread, the standard deviation, $\sigma_f$, i.e., rms Doppler spread, of the average power vs. frequency is a measure of the multipath Doppler width. Dividing by the signal bandwidth B, $\sigma_f/B$ is defined as the normalized Doppler spread. In systems that adapt the data rate and channel resources in order to match fading conditions, the adaptation rate normalized by dividing by the receiver bandwidth must be significantly greater than the normalized Doppler spread. A typical value of the rms Doppler spread $\sigma_f$ is on the order of 1 Hz with maximum values that may reach a value of 10 Hz.

In addition to the forward scatter fading in tropospheric scatter systems described above, there is a long term fading component that has variations that are hourly, diurnal, monthly, and seasonal. In the past the long-term variations in these systems were compensated by designing the link for the worst few hours of the year. Present systems can compensate for these long-term variations with power control in order to reduce radio interference to other systems during conditions of strong signals. Present tropospheric scatter radio systems do not use adaptive data rate techniques as employed in cellular radio systems such as 4G LTE and WLAN WiFi for fade compensation.

In present day radio systems where frequently only one frequency channel and one antenna is provided in each direction, the diversity options reduce to an implicit diversity realized by multipath combining in an equalizer structure, and explicit diversity systems such as angle and polarization. Military tactical tropospheric scatter radio links tend to be shorter where angle diversity is not effective. Consequently, the utility of using orthogonal polarization transmission needs to be evaluated for present-day tropospheric-scatter radio systems.

Dual-polarization transmission has been used extensively in satellite and terrestrial line-of-sight radio systems. Cross-polarization cancellers are used in these systems to cancel cross-polarization components in each of the polarization channels. The required cancellation can be combined with equalization as in U.S. Pat. No. 4,112,370, "Digital Communications Receiver for Dual Input Signal, filed 5 Sep. 1978, which uses four tapped equalizer weights corresponding to the two straight-through and two cross over polarization paths or in U.S. Pat. No. 4,631,734, "Cross-Polarization Canceler/Equalizer", filed 21 Mar. 1985, which uses four tapped delay line (TDL) equalizers corresponding to the two straight-through and two cross over polarization paths. The equalization required in satellite and terrestrial radio systems is relatively small compared to tropospheric-scatter radio systems and the latter also may include additional diversity receptions. Alternatives to the TDL equalizer structure should be examined in light of these factors for a tropospheric-scatter application. The forward scattering of the transmitted signal in the atmosphere of a tropospheric-scatter link produces multipath signal returns (frequency dispersive fading) and corresponding intersymbol interference (ISI) that must be compensated for if communication is to be successful. In *Feedback Equalization for Fading Dispersive Channels*, P. Monsen, IEEE Trans. on Information Theory, pp. 56-64, January 1971 (hereafter Feedback Equalization and incorporated by reference), the theory for performing this compensation proved that the decision-feedback equalizer (DFE) is the optimum linear receiver given that past symbol decisions are correct. In the digital tropospheric-scatter systems, which came into existence in the 1970s, dual and quadruple diversity was employed. A prior art technique based on the theory in Feedback Equalization was developed for tropospheric-scatter applications and is described in *Megabit Digital Tropospheric-scatter Subsystem*, C. J. Grzenda. D. R. Kern and P. Monsen. NTC Conference Record, New Orleans, December 1975, pp. 28-15 to 28-19 (hereafter MDTS and incorporated by reference). These early systems were uncoded and later systems added forward-error correction (FEC) coding with convolutional codes. The combining of diversity signals reduces some of the ISI and the signal-to-noise threshold for acceptable communication at the DFE output was relatively large for both uncoded and coded systems such that the assumption of correct decisions was realized. Present-day systems use more powerful forward-error correcting codes such as Low Density Parity Check (LDPC) and Turbo Product Codes (TPC) techniques that operate at a much lower uncoded signal-to-noise ratio at the DFE output with the possibility of increased error propagation effects.

Many earlier tropospheric-scatter systems employed a D-order diversity receiver based on MDTS that includes a DFE with D forward filters and a backward filter that feeds back the past decisions. The DFE was adapted by an estimated gradient (EG) algorithm. The EG algorithm allows for adaptation with a large set of DFE coefficients. For example, some present-day quadruple-receivers have four forward filters with six coefficients each and a backward filter with four coefficients resulting in 28 DFE coefficients. Because the forward filter uses two samples per modulation symbol in order to meet Nyquist filtering requirements, the total equalization span of the DFE is the number of forward filter coefficients per diversity divided by two plus the number of backward filter coefficients. Thus for this 28 coefficient DFE example, the equalizer span is only 7 modulation symbols. Furthermore, the more total coefficients, the longer the adaptation time for a fixed equalization quality with the EG algorithm.

In U.S. Pat. No. 7,590,204 B2 "Technique for Adaptive Equalization in Band-Limited High Data Rate Communication over Fading Dispersive Channels', filed 6 Feb. 2006, (hereafter the '204 patent and incorporated by reference) an optimum finite-length Decision Feedback Equalizer (DFE) is described for a spectrally efficient high data rate in conventional space/frequency diversity applications. Rather than estimating the equalizer parameters using the EG algorithm as in prior art techniques such as MDTS, the DFE in the '204 patent is adapted within an adaptation frame which is sufficiently short such that the time-varying channel does not significantly change. Within the adaptation frame the channel is estimated using reference data that has been transmitted along with digital data information and the reference data is locally available at the receiver. The DFE parameters are then computed directly from the channel parameters. Because the DFE parameters are computed from the channel parameters, that have some error due to additive noise, this error can result in some equalizer degradation. The DFE in the '204 patent requires only one forward filter regardless of the diversity order. In the forward filter of the DFE there are P-coefficients associated with modulation symbol delays such that the equalization span is P plus the number B of backward filter coefficients. In the 20 Mbps TM-20 troposcatter modem, whose development was based on the '204 patent, (see *Radyne Troposcatter Modem used in First Ku band Link*, prnewswire.com, 16 Jun. 2006), P=10. B=9 for an equalization span of 19 modulation symbols. This significant increase in equalization span allows for operation at higher data rates where there is increased ISI under the same channel conditions.

A present or future tropospheric-scatter radio systems will increasingly handle Internet Protocol (IP) traffic instead of a high speed digital data trunk containing a mixture of digitized voice and computer data. In previous systems the data rate associated with the digital data trunk was fixed so that if communication conditions improved there was no mechanism for exploiting the improved conditions. Other than power control to avoid interference due to long-term changes in channel conditions, present-day tropospheric radio systems do not use techniques to adapt the data rate in response to fading conditions. Further, performance is conventionally measured by the average bit-error rate where the average is over many fading epochs. Packets sent using Internet Protocol may be retransmitted if a certain quality level is not achieved. In voice IP transmissions (VOIP) the packets may not be retransmitted but a certain quality level corresponding to the maximum number of error bits in the packet, i.e., a minimum packet bit error rate (BER), is important. Consequently data rate throughput and minimum packet BER are criteria of importance in the IP systems.

Fading dispersive channels in tropospheric-scatter duplex (opposite directions simultaneously) applications are not reciprocal, i.e., the channel conditions are not the same in both communication link directions. This lack of reciprocity arises from the need to separate transmit and receive frequencies at a single terminal end. Since transmission and reception is not on the same frequency, the frequency selective fading in the dispersive channel will preclude reciprocity. Receiver-Transmitter feedback communication can be used on communication links that are not reciprocal in order to relate back to the transmitter the quality of reception at the distant terminal. Practical feedback communication techniques must cope with transmission delay, time variation of the channel, error in quality assessment at the receiver, potential errors in the feedback message, and additional overhead to support quality assessment and the feedback message. An adaptive data rate technique using Receiver-Transmitter feedback communications, described in U.S. Pat. No. 7,751,372 B2 Technique for Adaptive Data Rate Communication over Fading Dispersive Channels, filed 4 Aug. 2006 (hereafter the '372 patent and incorporated by reference) can be used to track the fading channel and adjust the combination of data throughput and packet BER to best compensate for fading effects and data throughput requirements. In the '372 patent, the data rate is set based on data packet arrival rate and the link quality. Lower data rates use direct-sequence modulation so as to constantly fill the occupied bandwidth and maximize implicit diversity derived from the channel multipath returns. Higher data rates use a combination of multiple transmission sources in a Multiple-Input Multiple Output (MIMO) antenna port configuration, larger error correction code rates, and higher-order modulation constellations. In the '372 patent the receiver in the transmitter/receiver includes the nonstationary-output channel matched filter and decision-feedback equalizer described in the '204 patent. In the '372 patent the DFE is extended to include the mutual interference effects in MIMO modes caused when independent data is sent on transmit diversity channels that do not maintain their orthogonality. This DFE solves a linear set of equations determined by a correlation matrix whose rank depends on an intersymbol interference (ISI) parameter P that, in turn, depends on a matched filter length M, and a MIMO, i.e., transmit diversity, order $K_T$. The requirements for matched filtering are about the same for diversity modes and MIMO modes such that the latter results in a matrix that requires inversion of a matrix that has rank that is $K_T$ times larger for a fixed ISI parameter P. Complexity for solving a set of linear equations using, for example, a Cholesky decomposition as described in A. A. Giordano and F. M. Hsu, Least Square Estimation with Application to Digital Signal Processing, John Wiley and Sons, New York, N.Y., 1985. Chapter 3.3 varies as the cube of the equation matrix rank. Consequently, there exists a complexity issue with MIMO mode implementation in the '372 patent. Moreover, the correlation matrix depends on the direct-sequence mode (see the '372 patent at 18:12-14 and Eq. 16 at 19:16) resulting in extra calculations to accommodate multiple direct-sequence modes. Because the extended DFE solution in the '372 patent uses the channel estimates to directly calculate the DFE parameters, errors in the channel estimates which do not significantly degrade performance in diversity configurations may be more important when mutual interference must be cancelled in MIMO applications. The capacity results (see '372—FIG. 8) are based on an analysis that assumes that the transmit diversities maintain their orthogonality ('372 at 13:18-20). Due to the depolarization in dual transmission polarization applications, as noted above, these results represent a capacity upper-bound that is a goal for future systems.

The 4G-LTE uplink uses Single-Carrier Frequency-Division Multiple Access (SC-FDMA) (see 3GPP TS36.211. Physical Channels and Modulation Release 10, Section 5.) which results in the same single-carrier transmission format as used in the '372 patent. Accordingly, the 4G-LTE uplink requires a form of equalization, usually performed in the frequency domain, at the base station receiver. Unlike tropospheric scatter radio systems that have the same antenna configurations at each terminal, the 4G-LTE uplink in a diversity or MIMO mode has two closely spaced antennas on the mobile but can use widely spaced antennas at the base station to produce spatially decorrelated paths. Space diversity is generally superior to polarization diversity and polarization diversity also may perform poorly in suburban areas in cellular radio systems. Accordingly, present day cellular radio systems often use space diversity/MIMO transmissions rather than orthogonal-polarization diversity and dual polarization transmissions.

In a forward-scatter channel, the scattering occurs over small angles in the forward direction producing a small depolarization between orthogonally-polarized transmissions, i.e., the polarization correlation, $\rho$, is near unity. In *Investigations of Angular Scattering and Multipath Properties of Tropospheric Propagation of Short Radio Waves beyond the Horizon*. J. H. Chisholm. et. al., Proc. IRE, vol. 43, pp 1317-1335. October 1955, (hereafter Multipath Properties), experimental tests showed that the received orthogonal polarization component was 12 to 20 dB below that received in the nominal transmitted polarization. These tests led to the conclusion in Communication Systems and Techniques, M. Schwartz, W. R. Bennett, and S. Stein, McGraw-Hill, New York. N.Y. 1966, pp. 423-424. (hereafter Schwartz, Bennett, and Stein), that "the possibility of achieving dual diversity by transmitting in two orthogonal polarizations and receiving each separately . . . is not available in tropospheric scatter". This conclusion, in what has become a classic reference for radio communication systems, has been well followed over the years in tropospheric-scatter radio resulting in diversity implementations that rely on dual space or dual frequency diversity rather than dual polarization diversity. Unfortunately bandwidth allocations and mobility requirements often preclude frequency and space diversity implementations. Many present tropospheric-scatter applications are on links that are not long enough for angle diversity to be effective, and the terminal includes a single antenna and a single frequency allocation in each direction. On these links when normalized delay spread is small (<0.5), fades can easily exceed the 12 to 20 dB depolarized component measured in Multipath Properties. Accordingly, notwithstanding current practice, dual polarization diversity in these systems may provide a significant improvement. Concurrently, the depolarization in forward-scatter links cannot be ignored in dual transmission polarization applications because the mutual interference is not negligible.

The present invention focuses on the use of orthogonal polarization transmissions in diversity and multiple-transmission modes operating in a tropospheric scatter link application. Conventional MIMO techniques in other transmission media, e.g., cellular radio and wireless indoor/outdoor systems, use space and frequency transmission paths to realize higher data rates. In a 2×2 MIMO system, for example, there are four transmission paths between the transmitter and receiver and these transmission paths are either independent or highly uncorrelated. In such a system, the four transmission paths must be estimated and data rates allocated depending on their relative signal strength capabilities. Because of frequency channel restrictions and transportability issues in tropospheric scatter applications, many of these systems do not have space/frequency transmission capability and the only means for multiple transmissions is with the exploitation of orthogonal polarization. However, the dual transmission on orthogonal-polarizations (2PX) in a troposcatter link application does not correspond to the above conventional 2×2 MIMO example because of the channel symmetry that is induced in the highly correlated tropospheric scattering with orthogonal polarizations.

Forward scatter in tropospheric-scatter links is modeled as independent fading processes each associated with a scattering delay value such that the impulse response is complex Gaussian with average power at each scattering delay described by the multipath profile. However with transmission on orthogonal polarizations, the fading in a forward scatter process includes a dominant scattering component in the same-polarization axis and a weak scattering components that contributes equal average energy along each of the two polarization axes. In a conventional 2×2 MIMIO configuration, the fading process can be described by the four transmission path impulse responses $h_{ij}$, i,j=1, 2 when each path can be represented by an uncorrelated complex Gaussian process that is normalized to a unit energy multipath profile. In a correlated 2×2 MIMO configuration corresponding to dual-polarization transmission in a forward scatter application, the same-polarization paths $h_{11}$ and $h_{22}$ have a correlation coefficient of $\rho$. The cross-polarization paths are the results of polarization-axis independent scattering that is equally divided between the polarization axes and should have the same energy as the depolarized component in the same-polarization path. The correlated MIMO model for this polarization scattering process includes four independent complex Gaussian processes, $h_i$ i=1, 2, 3, 4, also normalized with a unit energy multipath profile, that are combined with the polarization constants $c_1$ and $c_2$ to produce $$h_{11} = c_1 * h_1 + c_2 * h_2.$$

$$h_{22} = c_1 * h_1 - c_2 * h_2.$$

$$h_{12} = c_2 * h_3.$$

$$h_{21} = c_2 * h_4.$$

The polarization coefficients $c_1$ and $c_2$ are a function of the polarization coefficient $\rho$. For normalization of the multipath profile to unit energy, the coefficients must satisfy $$c_1^2 + 2c_2^2 = 1.$$

and for the correlation coefficient $\rho$, one requires $$c_1^2 - c_2^2 = \rho.$$

with the result that $$c_1 = sqrt\left(\frac{1+\rho}{3-\rho}\right),$$

-continued $$c_2 = sqrt\left(\frac{1-\rho}{3-\rho}\right).$$

For perfect correlation, $c_2$ is zero and there are no cross-polarization paths. For a conventional 2×2 MIMO when the polarization coefficient $\rho$ is zero, there are four independent equal-strength Gaussian processes. In tropospheric scatter applications using orthogonal transmissions, the 12 to 20 dB depolarized component measured in Multipath Properties corresponds to a range of large polarization coefficients from about 0.88 to 0.98. Notwithstanding the correlation, the four independent Gaussian processes in a dual polarization transmission mode will result in some diversity potential that will be exploited in the present invention along with the required cancellation of the interfering transmission.

Signal demodulation in the present invention provides optimum or near-optimum performance at critical signal-to-noise ratios for present-day LDPC and TPC error-correcting codes. Additionally, the present invention accommodates a large range of both signal-to-noise ratio and delay spread, while operating in both diversity and multiple-transmission modes with possibly large modulation constellation sizes. In order to exploit any significant depolarization in forward-scatter fading, the minimum diversity configuration is selected as dual polarization (2PD) and the minimum multiple-transmission configuration is selected as dual-polarization transmissions (2PX). In the 2PD and 2PX configurations, transmission is on two orthogonal polarizations, e.g., horizontal and vertical.

Because the depolarizing component is small, the reduction of intersymbol interference (ISI) in the diversity combining in the 2PD mode will not be as effective as in frequency and space diversity systems. The potential for increased ISI and the lower threshold of uncoded signal-to-noise ratio associated with LDPC and TPC codes at an equalizer output results in a larger error propagation effect with the use of a DFE thus reducing the traditional advantage of the DFE over the LE. Prior art literature has shown that the DFE is superior to the LE (see, for example, *Broadband Wireless Using Single Carrier and Frequency domain Equalization*, D. D. Falconer and S. L. Ariyavisitakul, WPMC '02, Honolulu H I, October 2002 and *Frequency Domain Equalization for Single-Carrier Broadband Wireless Systems*, D. D. Falconer, et. al., IEEE Communications Magazine, April 2002. However, these frequency-domain equalizer prior art articles base this conclusion on simulated results that use convolutional codes instead of the more powerful codes such as LDPC and TPC. Computer simulation of the outage probability performance of the present invention with equal size LE and DFE equalizers shows approximately equal performance for lower-order modulation constellations such as BPSK and QPSK but superior DFE performance for a higher order constellation such as 16PSK. With an equal number of equalizer coefficients the DFE is slightly more complex than the LE because of the need to produce the receiver hard decisions for DFE processing. To insure a large equalization span, the linear and decision-feedback equalizer realizations in the present invention are implemented at the demodulated (coded) symbol rate rather than at the Nyquist sampling rate as in the above frequency-domain equalizer prior art and in the tropospheric-scatter prior art in MDTS.

Figure 2:
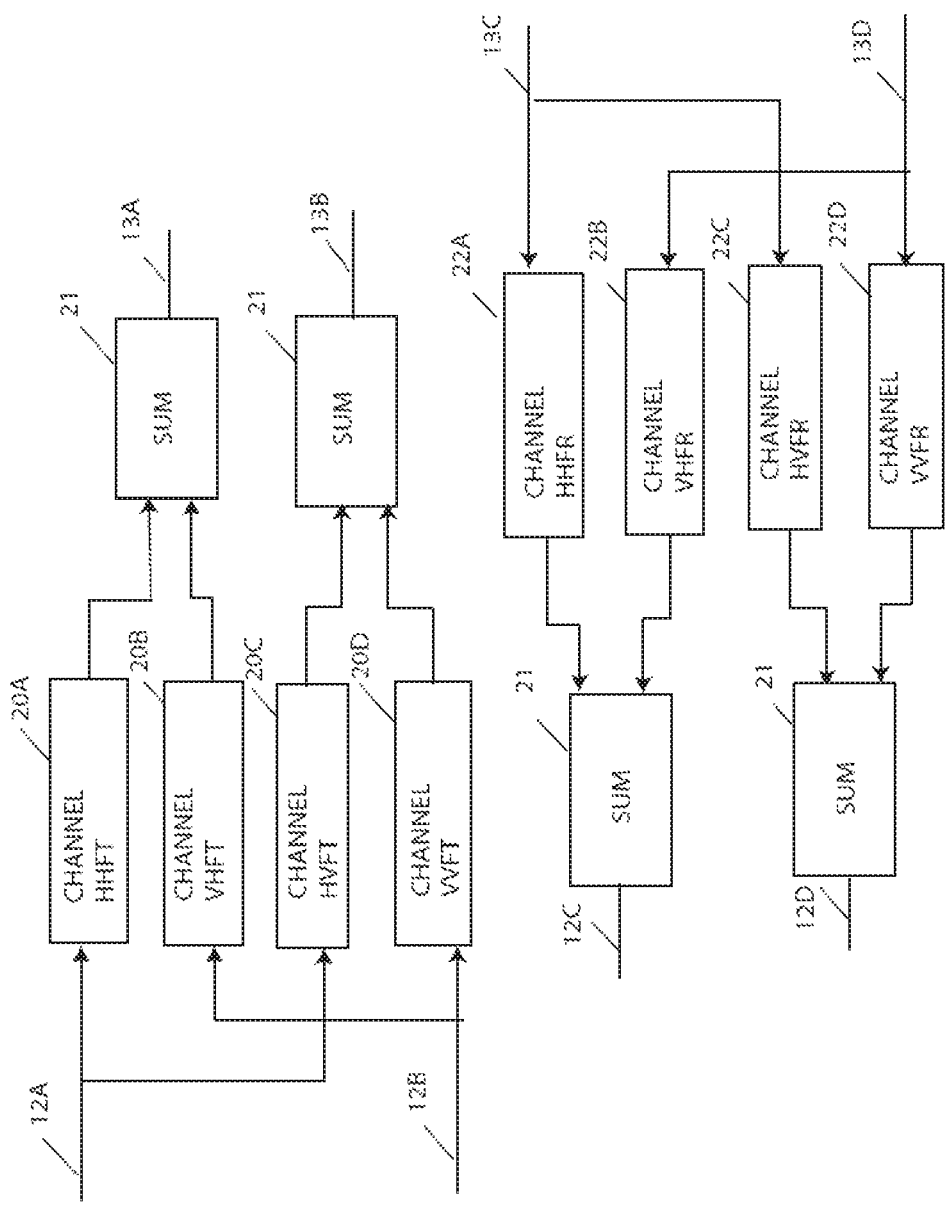
FIG. 2 is a block diagram of the exemplary fading channel of FIG. 1.

FIG. 1 illustrates the transmitter/receiver 10 of the present invention connecting through polarization duplexers 11 to an orthogonal-polarized feedhorn 12. The transmitter outputs 10A and 10b, at a transmit frequency $f_T$, are derived from a single transmission source and are the same diversity signal for the 2PD mode. There are two transmission sources producing two independent signals for the dual transmission mode 2PX. Receiver input signals 10C and 10D, at a receive frequency $f_R$, are separated by their frequency difference from the transmitter signals in the polarization duplexers 11. While the exemplary embodiment of the transmitter/receiver 10 shown in FIG. 1 depicts a transmitter and a receiver housed in a single unit, it is contemplated within the scope of the invention that the transmitter and receiver may be housed in separate units and operably connected to one another via a communication link or a data link (e.g., a bidirectional data link, a unidirectional data link, etc.) that may operate in simplex mode, half-duplex mode, or duplex mode. Because of the very large dynamic range that exists between transmitter and receiver signals, there must be a significant separation of frequencies $f_T$ and $f_R$. In a typical application, the orthogonal-polarized feedhorn illuminates a parabolic antenna for transmission and reception to and from fading channel 13. The fading channel outputs 13A and 13B are produced as shown in FIG. 2 by four channel paths corresponding to the combination of direct and cross paths between the feedhorn at the local terminal and the feedhorn at the remote terminal for each of the polarizations. The direct path is between the same polarizations and the cross path results from the depolarization in the forward-scatter channel. In a horizontal/vertical polarization example, these channel paths are Horizontal-Horizontal at Frequency $f_T$ (HHFT) 20A, Horizontal-Vertical at Frequency $f_T$ (HVFT) 20C, Vertical-Vertical at Frequency $f_T$ (VVFT) 20D, and Vertical-Horizontal at Frequency $f_T$(VHFT) 20B. The direct and cross channel path outputs are added in Sum 21 to produce at the remote terminal feedhorn a received signal 13A at a horizontal-polarization and a received signal 13B at a vertical-polarization. Fading channel inputs from the remote terminal feedhorn include a transmitter signal 13A at a horizontal-polarization and a transmitter signal 13B at a vertical-polarization. As shown in FIG. 2, these signals pass through the direct and cross channel paths 22A,B,C,D and are added in Sum 21 to produce the local terminal feedhorn horizontal-polarization signal 12C and the vertical-polarized receiver signal 12D.

Because of the presence of a dominant scattering that maintains polarization, the 2PX transmission mode can set the branch data rates $R_1$ and $R_2$ equal so that the data rate is equal to $2R_1$. Beyond the 2PD diversity mode and the 2PX transmission mode, higher-order diversity and transmission modes are realized by adding space (S), frequency (F), and/or angle (A) resources. Common quadruple-diversity configurations are 2P/2S, 2P/2F, and 2P/2A. Dual transmission/dual diversity can be accomplished with 2PX/2S, 2PX/2F, and 2PX/2A. Better performance in these higher-order diversity systems is realized using polarization for the dual transmissions because the significant polarization correlation in forward-scatter fading limits the diversity performance. In the present invention these higher-order diversity modes require additional matched filtering but the equalization structure does not change.

Figure 3:
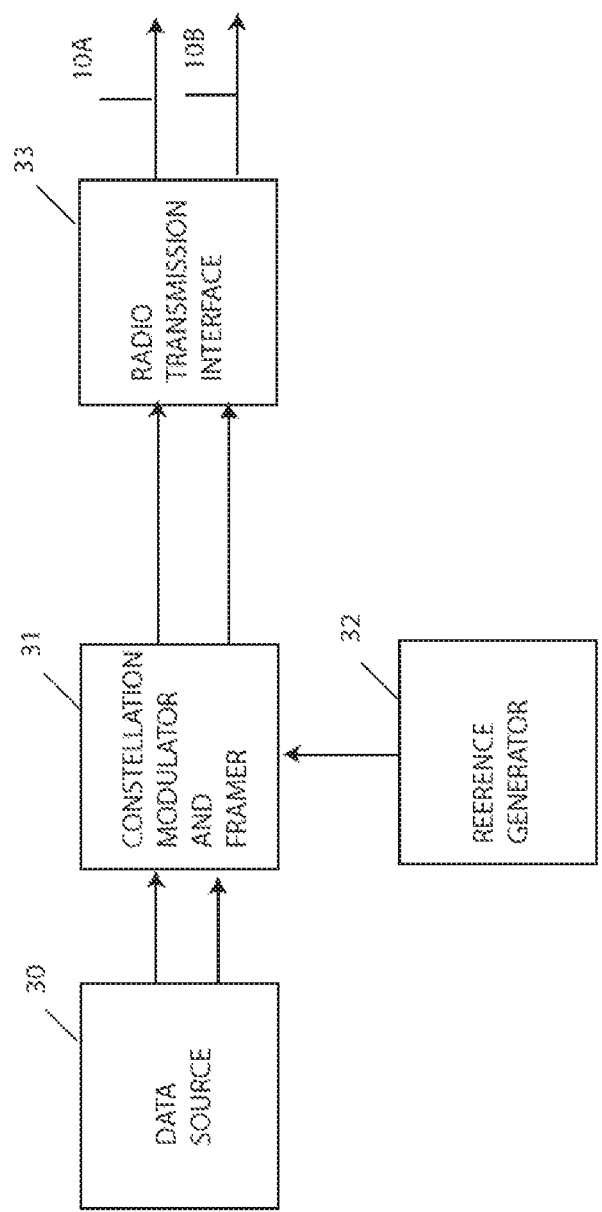
FIG. 3 is a block diagram of the exemplary transmitter in the exemplary transmitter/receiver of FIG. 1.

The local-to-remote channel of FIG. 2 results in polarization-port channels for polarization port combinations such that channel H(i,j) is the channel transfer function for the ith transmitter polarization port, i=1 (12A) and i=2 (12B) and jth receiver polarization port, j=1 (13A) and j=2 (13B). H(i,i), i=1, 2 represent the direct-polarization paths and H(i,j), i≠j, represent the cross-polarization paths. For the 2PX mode the transmission source i is transmitted from polarization port i. Accordingly. C(i,j)=H(i,j) represents the four transmission-source receiver polarization-port channel transfer functions to be estimated. In the 2PD mode there is one source and two receiver polarization ports so that the transmission-source receiver polarization-port channel transfer function is C(j)=H(1,j)+H(2,j), j=1, 2. In this mode there are two channel transfer functions that must be estimated in the present invention The transmit signal functions in an exemplary embodiment of the transmitter/receiver of FIG. 1 is shown in FIG. 3. A data source 30 including either one or two transmission sources produces transmission source information data, that is forward error-corrected (FEC) (including interleaving, as required) to provide coded data. Example of FEC coding include near-capacity codes such as Low Density Parity Check (LDPC) codes and Turbo Product Codes (TPC). In a preferred embodiment, the FEC is selected as 64K LDPC specified for use in Digital Video Broadcast (DVB) applications (DVD-S2 Standard 1 Nov. 2014) such as Direct TV. The transmission source coded data is converted to modulation symbols by constellation modulator and framer 31. The framer produces one or more data subframes of modulation symbols that are time-division multiplexed with a reference subframe of reference symbols, also with same modulation symbol period. Reference data is produced by Reference Generator 22 and then constellation modulated to produce the reference symbols. Computer simulation tests show that the most effective reference symbol sequence for channel adaptation and equalization corresponds to 2PSK modulation regardless of the constellation used for the transmission source information data, The reference and source data modulation symbols have a fixed modulation-symbol period of T seconds. Data rates are changed by changing the forward-error correction (FEC) code rate and/or changing the modulation order used to produce the source-data modulation symbols. By maintaining a fixed modulation-symbol rate within an assigned bandwidth, maximum utilization of implicit diversity due to multipath is realized. Reference and modulation symbols are framed into respective reference and data subframes in constellation modulator and framer 31. In the exemplary embodiment, a frame consists of a reference subframes followed by $N_M$ data subframes. The constellation modulation for data subframes includes any signal constellation with a finite alphabet and either real or complex symbols. Two important examples are M-ary phase-shift-keying (MPSK), where the symbols are complex and can be represented by the set $\exp(j2\pi m/M + j\pi\Delta_M/4)$, m=0, 1, ... M−1, $\Delta_M$=1. M=4, $\Delta_M$=0, otherwise and Quadrature Amplitude Modulation (M-QAM), where, for the example of M=16, under the same peak-power constraint as MPSK, the symbols are (+−1+−j/x)/√2, x=1, 3 and (+−1/x+−j)/√2, x=1, 3. For these M-ary modulation systems there are $\log_2$ (M) bits per symbol. The reference subframe contains 2PSK modulation symbols.

Using a spectrum control filter, periodic modulation symbols are filtered to produce continuous-time signals that are then Radio Frequency (RF) converted to the radio carrier frequency in radio transmission interface 33. Radio transmission interface 33 includes conversion to radio frequencies, a spectrum control filter, and the insertion of a cyclic prefix in all subframes in order to avoid guard time allocations for filter ramp-up and ramp-down times and for protection against subframe interference due to multipath. The spectrum control filter can be realized digitally in the time domain using, for example, a shift register at an integer-multiple of the modulation-symbol rate (up-sampling) with fixed tap register weights in a finite impulse response (FIR) filter, or in the frequency domain by multiplying the fast-Fourier transform (FFT) of the up-sampled $N_F$ modulation symbols in the subframe by the FFT of the spectrum control filter impulse response to produce the filtered subframe. The domain realizations are equivalent if the convolution in the time domain realization is circular within the subframe. Conventionally the spectrum control filter is a Square-Root Raised Cosine (SRRC) with a roll-off factor of $r_S$, such that the bandpass (two-sided) bandwidth of the transmitted signal is approximately B=(1+$r_S$)/T, 0<$r_S$<1. A typical roll-off factor in tropospheric radio systems is 0.4. For an FEC code rate of r, the radio system transmits $R_r/B$=r $\log_2(M)/(1+r_S)N_{DS}$ bits/second/Hz. Transmission source data outputs from radio transmission interface 33 are provided to polarization duplexers 11 in FIG. 1 on links 10A and 10B. Link 10A is assigned transmission source 1 and link 10B is assigned transmission source 1 for the dual diversity mode and transmission source 2 for the dual transmission mode.

For a frequency-domain realization of the transmitter in the present invention, it is desirable to use FFTs with order equal to a power of two. Bandwidth allocation in many present-day tropospheric-scatter radio applications are in 14 MHz segments. Assuming an allocation of two contiguous segments, a preferred embodiment is described here for a bandwidth allocation of 28 MHz. With a spectrum control filter roll-off factor of 0.4, the modulation-symbol period T using the above bandwidth equation is 50 ns. The radio transmission interface 33 inserts a cyclic prefix to preserve circular convolution properties and preclude interference between subframes. For a worse-case normalized delay spread of 6 at 28 MHz, an rms delay spread value $\sigma_d$ is 214 ns relative to a modulation-symbol period of 50 ns. Selecting a cyclic prefix length of 12 modulation symbols results in good subframe interference protection and a small cyclic prefix loss. An FFT size of $N_F$=256 is selected, resulting in a subframe length of 0.0134 msec including the 12 symbol cyclic prefix. The cyclic prefix loss is 0.2 dB. Simulation tests of both 2PD and 2PX modes have shown that excellent adaptation can be accomplished with 256 reference symbols. The preferred DVB LDPC code has 64,800 coded bits. For a frame with a constant subframe size of 256 symbols, the frame requires a reference subframe and 127 data subframes in a QPSK mode for a total of 128 subframes. Note that there are extra symbols not devoted to either the reference or data in the frame. These extra symbols are used to send the control and feedback symbols that are required, for example, in Adaptive Data Rate.

A typical value of Doppler spread $\sigma_f$ is 1 Hz and approximating the Doppler spectrum as Gaussian yields the autocorrelation function $$\rho = e^{-(2\pi\tau\sigma_f)^{\wedge}2} \tag{1}$$

where the time constant is seen to equal the reciprocal of the radian rms Doppler spread. For a 99% decorrelation time by the frame end. Eq. (1) suggests a frame length of about 1.6 msec for the 1 Hz rms Doppler spread. The signal-to-noise ratio loss due to the transmission of a reference block is equal to the ratio of the number of subframes in the frame divided by the number of data subframes. Good adaptation and small reference loss is then achieved with the above frame choice of one reference and 127 data subframes. The reference loss is 0.034 dB and the frame length is 1.7 msec. In simulations this frame length has been shown to result in negligible decorrelation loss for Doppler spreads up to and including 10 Hz.

For this transmitter embodiment, Table 1 provides the information data rates available in an adaptive data rate example that uses combinations of FEC code rates and modulation orders. Table 1a provides a selection of information rates for each branch in the dual-polarization transmission (2PX) configuration. In the 2PX configuration, the total data rate is equally divided between the two branch data rates. The 2PX total data rate has a 9.48 Mbps minimum and a 136.48 Mbps maximum in this 28 MHz example. Table 1b provides a selection of information rates for the dual-polarization diversity (2PD) configuration. Although direct-sequence modulation can be used to realize lower data rates, there is more implementation and mode transition complexity associated with direct-sequence modulation than this adaptive data rate example which uses BPSK with lower code rates. Both techniques maintain a constant modulation symbol rate and an associated increase in implicit diversity as the data rate decreases.

spreads. After time-sampling, radio reception interface 40 includes removal of the cyclic prefix inserted at the transmitter. The samples are then filtered with a fixed filter that is the complex conjugate and inverted impulse response of the spectrum control filter to produce polarization-port fixed-filter samples that are provided to estimator/channel matched filter 42. In a preferred embodiment the filtering is accomplished either in the time domain with circular convolution within the subframe or with FFT multiplication in the frequency domain.

In the reference subframe in the receiver, reference generator 41 produces a reference replica 41A of the 2PSK reference symbols for each respective transmission source. The reference symbols are unique for each transmission source in order to differentiate between the sources in the receiver adaptation. Reference replica 41A is provided to equalizer calculator 44 for calculation of equalizer parameters to be discussed subsequently. In the 28 MHz preferred

TABLE 1

Table 1a
2PX

Ref. Factor Branch = 0.992200
Roll-off Code Rate = 0.4
CP Factor Total = 0.955200
Data Modes Bandwidth = 28.0 MHz

| Modulation | bits/symbol | | Spec. Eff. b/s/Hz | Data Rate (Mbps) | Peak/Avg Loss (dB) | Mod. Gain (dB) |
|---|---|---|---|---|---|---|
| BPSK  | 1.00000 | 0.25 | 0.16924 | 9.48   | 0.0  | 0.0  |
| BPSK  | 1.00000 | 0.50 | 0.33848 | 18.95  | 0.0  | 0.0  |
| BPSK  | 1.00000 | 0.75 | 0.50772 | 28.43  | 0.0  | 0.0  |
| QPSK  | 2.00000 | 0.75 | 1.01545 | 56.86  | 0.0  | 0.0  |
| 8PSK  | 3.00000 | 0.75 | 1.52317 | 85.30  | 0.0  | −3.4 |
| 16QAM | 4.00000 | 0.75 | 2.03089 | 113.73 | −2.6 | −3.7 |
| 16QAM | 4.00000 | 0.90 | 2.43707 | 136.48 | −2.6 | −3.7 |

Table 1b
2PD

Ref. Factor Diversity = 0.992200
Roll-off = 0.4
CP Factor Diversity = 0.955220 MHz
Data Modes Bandwidth = 28.0 MHz

| Modulation | bits/symbol | | Spec. Eff. b/s/Hz | Data Rate (Mbps) | Peak/Avg Loss (dB) | Mod. Gain (dB) |
|---|---|---|---|---|---|---|
| BPSK  | 1.00000 | 0.25 | 0.16924 | 4.74  | 0.0  | 0.0  |
| BPSK  | 1.00000 | 0.50 | 0.33849 | 9.48  | 0.0  | 0.0  |
| BPSK  | 1.00000 | 0.75 | 0.50773 | 14.22 | 0.0  | 0.0  |
| QPSK  | 2.00000 | 0.75 | 1.01547 | 28.43 | 0.0  | 0.0  |
| 8PSK  | 3.00000 | 0.75 | 1.52320 | 42.65 | 0.0  | −3.4 |
| 16QAM | 4.00000 | 0.75 | 2.03089 | 56.86 | −2.6 | −3.7 |
| 16QAM | 4.00000 | 0.90 | 2.43707 | 68.24 | −2.6 | −3.7 |

Figure 4:
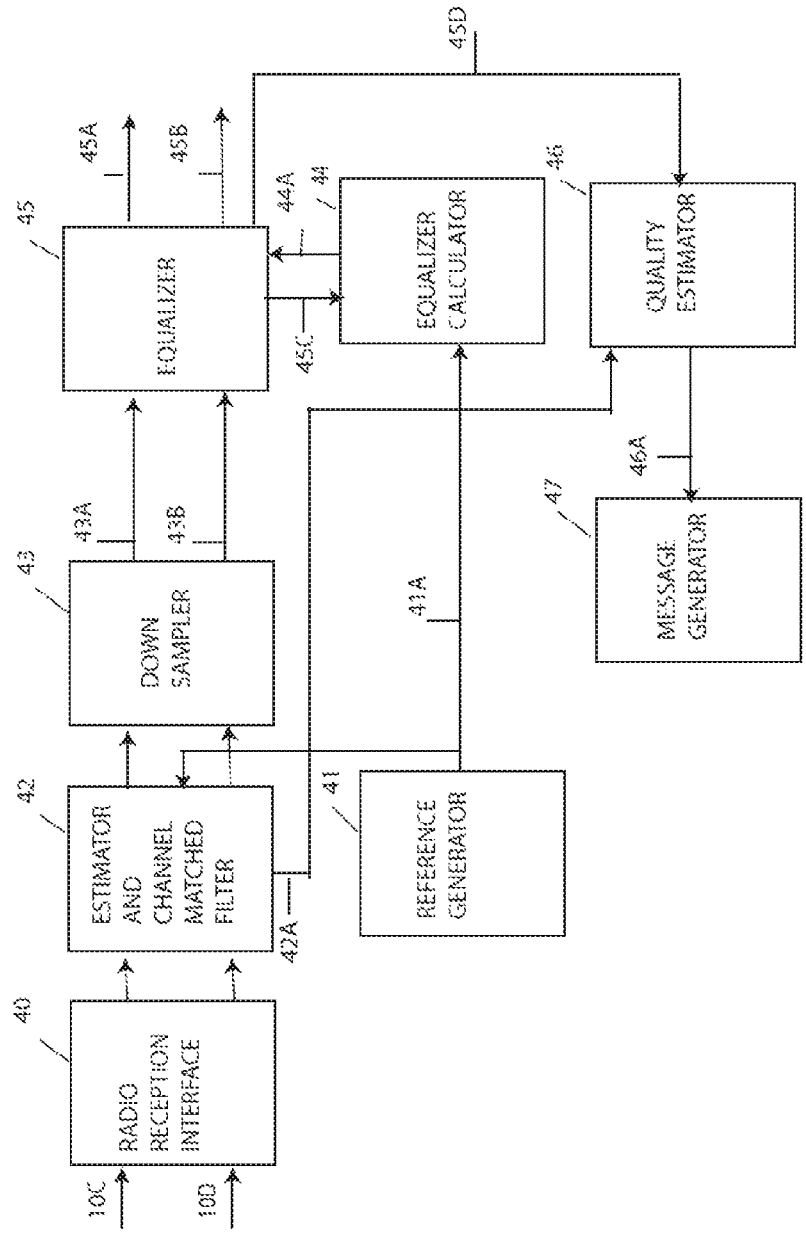
FIG. 4 is a block diagram of the exemplary receiver in the exemplary transmitter/receiver of FIG. 1.

A block diagram of the receiver in transmitter/receiver 10 is shown in FIG. 4. Polarization-port received signals 10C and 10D are provided to radio reception interface 40 where the received signals are converted from RF to baseband signals that are sampled at Q times the modulation symbol rate. The sampling rate for complex baseband signals must be at least as large as the Nyquist bandwidth which is greater than the modulation-symbol rate for practical SRRC filters with nonzero roll-off factors. A sampling rate of Q times the modulation-symbol rate satisfies the Nyquist criterion for arbitrary rolloff factor if Q is integer and Q≥2. Q equal to 2 is selected because no equalizer performance difference has been measured for Q>2 even for very small multipath delay embodiment, there are $N_F$=256 reference symbols in the reference subframe. The reference replica 41A is also provided to estimator/channel matched filter 42.

Estimator/channel matched filter 42 produces estimates of the four transmission-source receive polarization-port channels. $C(i,j)=H(i,j)$ i=j=1, 2 and i≠j in the dual transmission mode and two channels $C(j)=H(1,j)+H(2,j)$, j=1, 2 in the dual diversity mode. In both reference and data subframes, the polarization-port fixed filter samples are matched filtered with circular convolution (in the time domain) or FFT multiplied (in the frequency domain) with the respective complex conjugate inverted estimated channel impulse response (in the time domain) or with the respective complex conjugate channel estimate transfer function. The estimator/channel matched filter 42 further includes polarization-axis combining to produce a single set of channel-matched samples in a dual-diversity mode. In a dual-transmission mode, estimator/channel matched filter 42 produces channel-matched samples for each of the polarization axes. Estimator/channel matched filter 42 is followed by a down-sampling operation in down sampler 43 so that the output(s) are channel-matched symbols with period equal to the modulation symbol period. In an FFT receiver realization, down sampler 43 may be accomplished in the frequency domain by spectrum folding. The number of channel-matched symbols in the subframe is $N_F$.

The channel estimation in estimator/channel matched filter 42 is accomplished by a Least-Mean-Square Error (LMSE) optimization that produces a set of linear equations whose solution gives a weighted set of basis functions that is the optimum channel estimate. The LMSE equation set is described in the frequency domain. The $QN_F$ polarization-port fixed-filter samples in a reference subframe are represented as an FFT with components $R_m$, m=1, 2, ... $QN_F$. A set of orthogonal FFT basis functions are defined by the Kth order basis vector $B_m$, m=1.2, .... $QN_F$. The FFT channel estimate is the weighted set of basis functions $$\hat{C}_m = W'B_m \tag{2a}$$

where W is the channel-estimate weight vector of order K. One example of a set of basis functions can be derived from time domain realizations of channel estimating techniques that employ a tapped delay line (TDL) filter. Defining the K components of a TDL filter as $$b_m(k) = 1 \text{ if } m = \mod(k+k_o-1, QN_F)+1 \tag{2b}$$
$$= 0 \text{ otherwise, } m = 1, 2, \ldots, QN_F,$$

the FFT basis vector is the FFT of the K-vector FFT $b_m$, with components $b_m(k)$. The parameter $k_o$ is a synchronization value that centers the channel estimates in the TDL filter.

The polarization-port fixed-filter samples are a result of the transmission of modulation symbols through the combination of the spectrum control filter, the radio channel, and the fixed filter. Let $\Phi_m$=1, 2 ..., $QN_F$, represent the FFT of the autocorrelation function of the spectrum control filter impulse response and $C_m$ the radio channel transfer function. Note $\Phi_m$ is a power spectrum that is positive and nonzero in the signal band. The FFT of the polarization-port fixed-filter samples is then $$R_m = \Phi_m C_m S_m + \Psi_m \tag{3}$$

where $S_m$ represents the FFT components of the fixed-filter samples in the subframe and $\Psi_m$ corresponds to the colored noise at the output of the fixed filter. The colored noise has power spectrum proportional to $\Phi_m$. Least-mean-square error optimization is equivalent of maximum-likelihood estimation for white noise processes. Accordingly, the LMSE optimization should be performed on $R_m/(\Phi_m)^{1/2}$ and can be stated as $$\min_W \sum_{m=1}^{QN_F} \left| P_m - \Phi_m^{\frac{1}{2}} S_m W'_m B_m \right|^2 \tag{4}$$

where $$P_m = R_m/(\Phi_m)^{1/2}.$$

The optimum solution satisfies the orthogonality principle $$\sum_{m=1}^{QN_F} \left( P_m - (\Phi_m)^{\frac{1}{2}} S_m W' B_m \right)(\Phi_m)^{\frac{1}{2}} A_m B_m = 0$$

which leads to the optimum channel-estimate weight $$W = G^{-1}V \tag{5}$$

where the matrix and target vector are $$G = \Sigma_{m=1}^{QN_F} \Phi_m |S_m|^2 B_m B_m'$$

$$V = \Sigma_{m=1}^{QN_F} R_m^* |S_m|^2 B_m$$

Estimator/channel matched filter 42 requires the calculation Eq. (5) for each of the transmission sources and each of the two received polarization ports. The inverse matrix $G^{-1}$ can be precalculated and stored in the receiver because it is a function of the transmission source FFT of fixed-filter samples corresponding to the reference data that has been assigned to a particular polarization port. In dual diversity mode the channel-estimate weight vectors W(j), j=1, 2, corresponds to transmission source 1 connected through radio channel C(j) to receive polarization ports 1 and 2. In dual transmission mode the four estimate-channel weight vectors W(i,j), i=j and i≠j, I,j=1, 2 corresponds to transmission source i connected through radio channel C(i,j) to receive polarization port j. Estimator/channel matched filter 42 convolves the polarization-port fixed-filter samples with a matched-channel filter that is the IFFT of the complex conjugate of the channel estimate transfer function of Eq. (2). Convolution in the time-domain is multiplication in the frequency domain so the FFT of the polarization-port fixed-filter samples times the complex conjugate of the channel estimate transfer function of Eq. (2) is an equivalent implementation. The optimum finite-length Decision Feedback Equalizer (DFE) in the '204 and '372 patents uses a non-stationary-output channel matched filter (see the '204 patent at 21:8-14 and FIG. 4 and the '372 patent at 20:49-54) that cannot be realized with time-domain convolution or FFT multiplication as in the present invention. Tests have shown that the less complex but suboptimum convolution operation introduces negligible loss. In higher-order diversity modes such as dual-space diversity/dual polarization transmission (2SD/2PX) or dual-frequency diversity/dual polarization transmission (2FD/2PX), there are additional matched-channel filters for each of the diversities and subsequent combining of the diversities. In the present invention, the separation of the adaptive functions of channel matched filtering and equalizing allows additional diversities to be added without increasing the equalizing function.

Statistical parameters can be computed from the channel estimates denoted by the FFT vector:

$$C(i,j) = \{\hat{C}_m(i,j), m=1,2,\ldots,QN_F\}, i,j,=1,2$$

The polarization coefficient is $$\rho = D(1,2)/D(1,1) \tag{6}$$

where the correlation components are $$D(i,j) = E(C(1,i)'C(j,j))i,j=1,2.$$

The expected value E(•) is over many reference subframes. The multipath delay spread is measured as the rms width of the time domain multipath profile defined as the IFFT vector $$p = \{_m, m=1,2,\ldots,QN_F\}$$

where $$c=IFFT(C(1,1),QN_F)$$

$$p=E((c.*c)/(c'c))$$

where the dot-star notation indicates vector component by component multiplication. Because the power vector p is normalized to unity as a probability density function, the multipath delay spread is $$\sigma_d = sqrt(M_2(p) - M_1^2(p)) \quad (7)$$

where $M_i$, i=1, 2 are the first and second moments, respectively.

Figure 5:
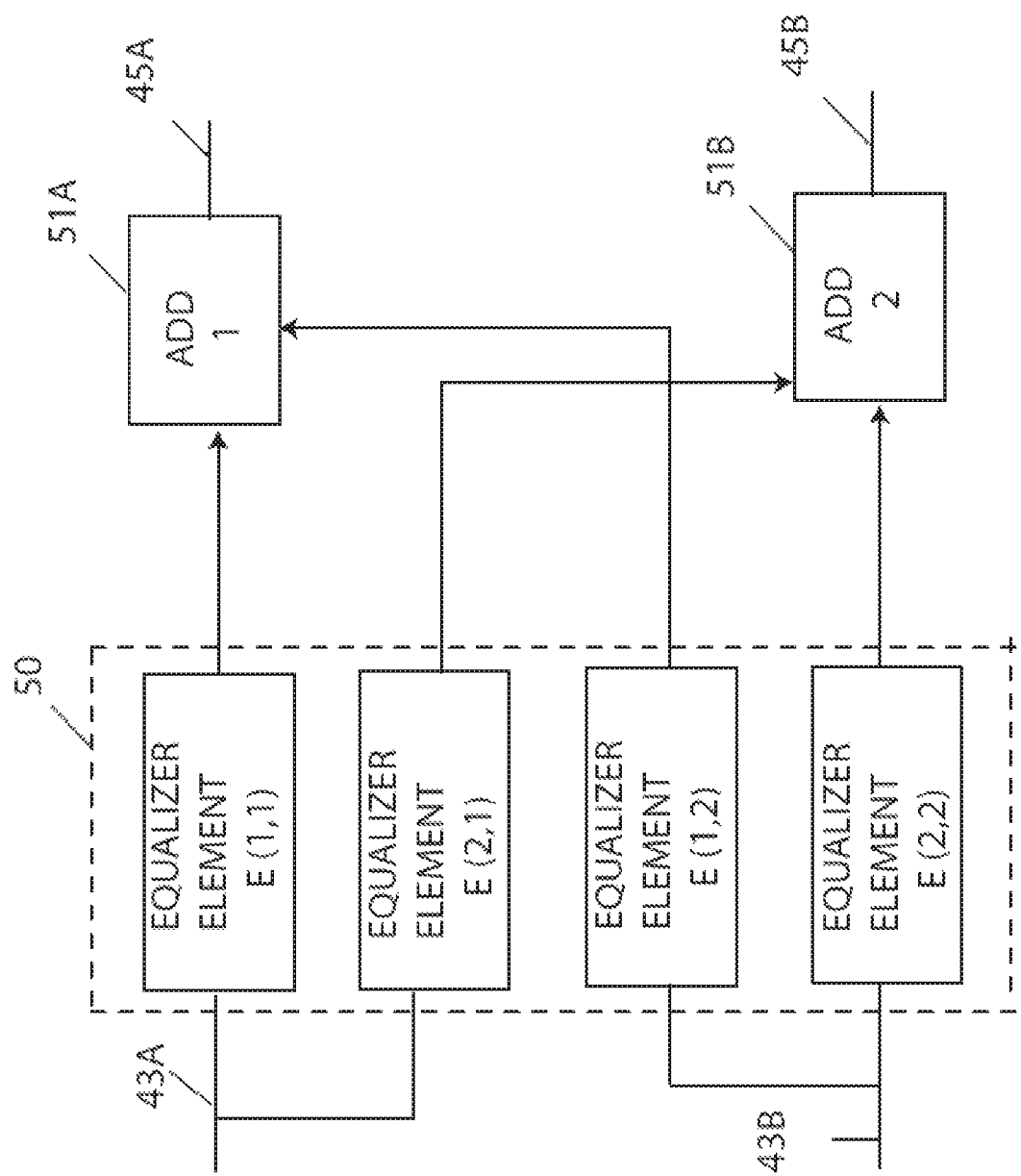
FIG. 5 is a block diagram for the exemplary dual transmission mode of the equalizer of FIG. 4.

To insure a large equalization span, the equalizer in the present invention is realized at the demodulated (coded) symbol rate. Additionally, to reduce potential equalizer degradation, rather than compute the equalizer parameters from the channel estimates as in the '204 and '372 patents, the equalizer parameters are obtained in equalizer calculator 44 from an additional Least-Mean-Square Error (LMSE) optimization using the reference replica 41A of reference symbols and the channel-matched symbols 43A output from down sampler 43. In FIG. 5 the equalizer 45 of FIG. 4 is shown for the dual transmission mode. In the dual diversity mode the estimator/channel matched filter 42 combines the received polarization signals so there is a single transmission source output. FIG. 5 for the dual diversity mode reduces to input 43A, one equalizer element in equalizer 45, and a single output 45A. A LMSE equation set and solution for the equalizer is described in the frequency domain using the same mathematical development as with the estimator/channel matched filter 42. In the dual transmission mode equalizer 45 includes four equalizer elements that can be represented by an equalizer vector FFT $$E_m(i) = \{E_m(i,j), j=1, \ldots, I\}, m=1,2, \ldots N_F; i=1, \ldots, I \quad (8)$$

which is a 2×1 vector FFT for the dual transmission mode (I=2) and a scalar FFT (I=1) for the dual diversity mode. The equalizer 45 is realized as the dot product $$E_m(i) = U(i)' \Omega_m \quad (9)$$

where U(i) is I*L×1 equalizer weight and $\Omega_m$ is an I*L×I basis matrix FFT. For the Linear Equalizer (LE) realization there are L weight coefficients and basis functions that are associated with the FFT of the channel-matched symbols. The Decision-Feedback Equalizer (DFE) has $L^{(F)}$ weight coefficients and basis functions in a forward filter that are associated with the FFT of the channel-matched symbols and $L^{(B)}$ weight coefficients and basis functions in a backward filter that are associated with an FFT of the hard decisions produced at the DFE output. For the DFE the $E_m$ vector is partitioned into an upper vector that represents the forward filter and a lower vector that represents the backward filter. In a preferred embodiment $L^{(F)} = [L/2] + 1$ where [ ] denotes integer truncation for L odd. For this choice, the forward and backward filters have equal number of coefficients to deal with the multipath-induced ISI. For I=2, the basis matrix FFT contains an L×1 basis vector $\Gamma_m$ in each of the upper and lower diagonals with zeros inserted elsewhere. In most applications the two basis vectors are the same. The basis vector has orthonormal FFT components. For example, it may contain a set of non-overlapping frequency regions or the FFT of a tapped-delay line filter as defined in Eq. (2a). The FFT of the equalizer input can be represented by $$Y_m = \{Y_m(i), i=1, \ldots, I\}, m=1,2, \ldots N_F \quad (10)$$

which for the LE is a 2×1 vector FFT for the dual transmission mode (I=2) and a scalar FFT (I=1) for the dual diversity mode. In a DFE realization the $Y_M$ vector is partitioned in accordance with the $E_m$ vector such that the FFT values of the channel-matched symbols 43A and 43B are in the first partition and the FFT values of the hard decisions are in the second partition. The FFT component products are the equalizer estimates 45A and 45B for each transmission source $$Z_m(i) = U(i)' \Omega_m .* Y_m \quad (11a)$$

Where the (.*) notation represents partition component multiplication for the DFE. It is convenient to define the equalizer input/basis product I*L×1 vector $$F_m = \Omega_m .* Y_m \quad (11b)$$

The equalizer estimates Eq. (11a) are provided to a subsequent decoder where FEC decoding is performed to generate estimates of respective transmission source information data. Although the DFE equations are given here in the frequency domain for the backward filter component, the need to make hard decisions on the equalizer symbol outputs requires an IFT before the decision device so that it is more convenient to implement the backward filter in the time domain.

An LMSE optimization problem exists for each transmission source. For a respective reference symbol FFT $A_m(i)$, m=1, 2, . . . , $N_F$ transmitted in the respective reference subframe and locally generated in reference generator 41, the LMSE optimization problem is $$\min_{U(i)} \Sigma_{m=1}^{M_F} |Z_m(i) - A_m(i)|^2 \quad (12)$$

In a similar manner to the LMSE equation solution described earlier with respect to the channel matched filter, the optimum equalizer weight solves the linear equation set $$HU(i) = X(i), i=1,2 \quad (13)$$

where the correlation matrix is an outer-product matrix of the equalizer input/basis vector, $$H = \Sigma_{m=1}^{M_F} F_m F_m', \quad (14a)$$

and the target vector is $$X(i) = \Sigma_{m=1}^{M_F} A_m^*(i) F_m \quad (14b)$$

The linear equation set Eq. (13) can be solved by first using a Cholesky decomposition of the matrix H to obtain a lower diagonal matrix as described, for example, in A. A. Giordano and F. M. Hsu, Least Square Estimation with Application to Digital Signal Processing. John Wiley and Sons. New York, N.Y., 1985, Chapter 3.3. Since the correlation matrix H does not depend on the transmission source i, the lower-diagonal matrix decomposition needs to be calculated just once and then used in Eq. (13) for both transmission source solutions. Returning to FIG. 4, Equalizer calculator 44 accepts the reference data $A_m(i)$ on link 41A from reference generator 41 and accepts the channel-matched symbols for each reference source during the reference subframe on link 45C from equalizer 45. Equalizer calculator 44 computes the lower-diagonal matrix, the target vector Eq. (14b) for each transmission source, and the weight vector solutions to Eq. (13). The latter is provided to equalizer 45 on link 44A. Note that for the dual diversity mode, there is only one transmission source and one equalizer weight vector calculation in Eq. (13). The complexity in equalizer calculator 44 is a result of the Cholesky decomposition and is proportional to the third order of the correlation rank. Thus, for a fixed complexity the number of weights for each mode is fixed. In the dual diversity mode, the weights act on only one input whereas in the dual transmission mode some of the weights are allocated to the same source path, i=j, and some of the weights are allocated to the cross source path, i≠j. Consequently, for this fixed complexity constraint, the dual diversity mode should be more robust against multipath than the dual transmission mode where protection against mutual interference is required.

After equalization, the equalizer estimates Eq. (11a) can be written in the time domain in terms of the unit energy reference symbol $a_m(i)$ as $$z_m(i) = \sqrt{\gamma E_s} a_m(i) + u_m \quad m=1,2,\ldots,M_F \quad (15)$$

where $\gamma$ is the average-to-peak power ratio for the constellation modulation, $E_s$ is the effective signal energy after traversing the radio channel, and $u_m$ is a residual noise symbol that contains gain variation, residual ISI, and channel noise. The reference symbol period is T seconds. If the variance of the complex residual noise symbol is $\eta_o/T$, the effective residual noise density is $\eta_o$. Neglecting any small correlation between the reference symbol and the residual noise, the average received symbol energy is $$E(z_m z_m^*) = \gamma E_s + \eta_0$$

and the branch (information bit) signal to noise ratio (BSNR) for an FEC code rate r is $$BSNR = \frac{\gamma E_S}{r \eta_0 \log_2 M} \quad (16)$$

where M is the number of modulation constellation points. If Eq. (15) is approximated by the average white Gaussian noise (AWGN) channel with spectral density $\eta_0$, an LMSE optimization for a single weight adaptation minimizes $$\varepsilon = (1/N_F) \Sigma_{m=1}^{N_F} |w^* z_m - a_m|^2. \quad (17)$$

Solving Eq. (16), the optimum weight is $$w = \frac{sqrt(\gamma E_S)}{\gamma E_S + \eta_0}$$

and the optimum mean-square error (MSE) is $$\varepsilon = \frac{\eta_0}{\gamma E_S + \eta_0} \quad (18)$$

Combining Eqs. (16) and (18) to obtain the relationship between BSNR and MSE, one has $$BSNR = \frac{1-\varepsilon}{r \varepsilon \log_2 M} \quad (19)$$

The MSE, $\varepsilon$, can be measured accurately in quality estimator 46 using the decisions on the equalizer estimates supplied on connection 45D. Quality estimator 46 forms the optimum modulation decisions $$\hat{a}_m(i) = f_d(z_m(i):M_c) \quad (20)$$

where, for example, the optimum decision function for QPSK is the complex sign function $$f_d(x:4) = 0.707 * csgn(x)$$

where csgn (•) is the complex sign function with outputs of ±1±j. The modulation decisions Eq. (19) are used in place of the unknown transmitted values $a_m$ to compute the MSE and BSNR.

The choice of data rate depends on two statistical parameters, polarization correlation. Eq. (6), and multipath delay spread, Eq. (7), and an instantaneous parameter, the branch BSNR (i), i=1, 2. Eq. (17). The branch BSNR is measured at the remote terminal receiver and must be sent back to the data-rate controlling transmitter at the local terminal. The branch BSNR is provided on link 46A to message generator 47 where a robust error correction/detection technique is used to create a message to be sent from the remote terminal transmitter within the next frame. In addition to the branch BSNR the message generator 47 must also transmit data rate/mode changes and confirmations from the local (remote) terminal to the remote (local) terminal. A small number of bits are required for these messages. A range of 0 to 8 dB for the branch BSNR with a precision of 0.5 dB gives 16 values or 4 information bits for each branch SNR value. A practical allocation is 4 bits for the data rate/mode changes and 4 bits for confirmation. The adaptive data rate system maintains a maximum bit error rate after FEC decoding, e.g. 1E-6. At these small bit error rates, modest coding protection, for example with Hamming codes, provides protection against ADR operational failures.

Figure 6:
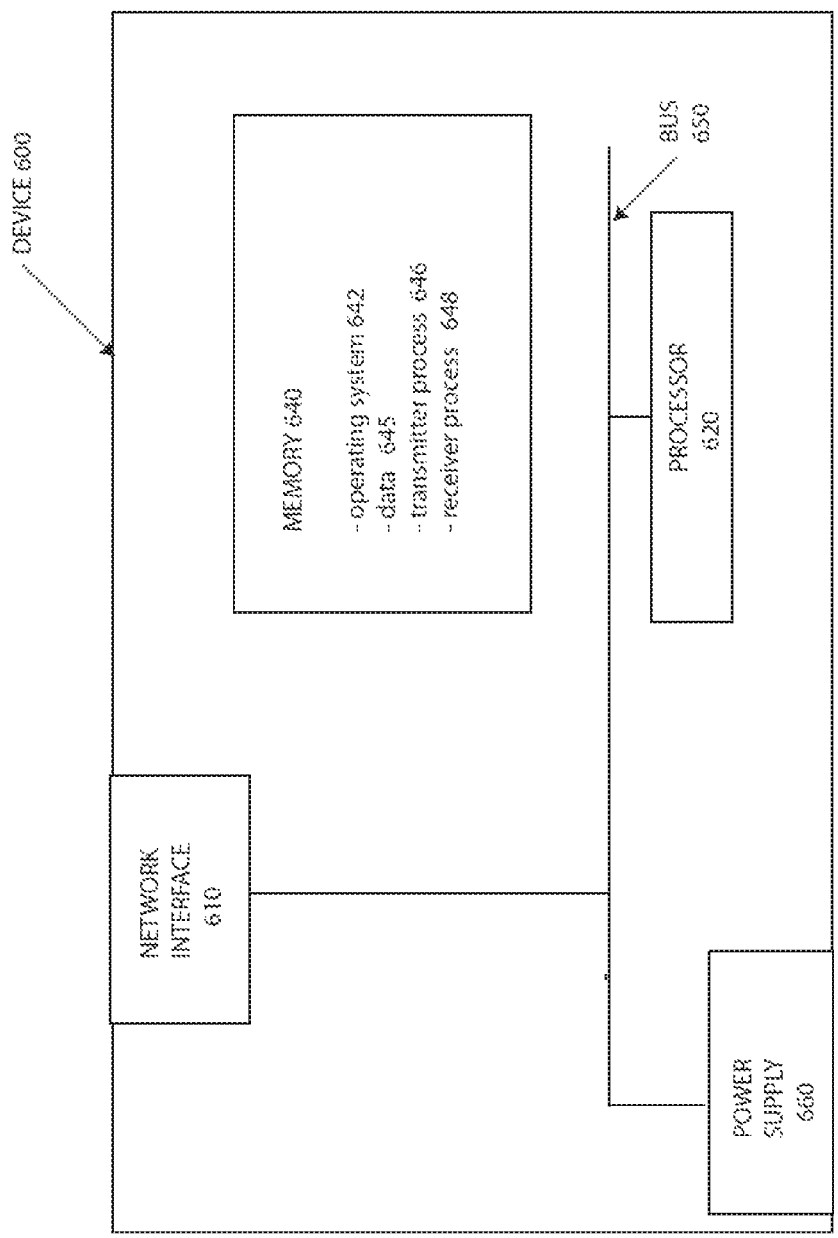
FIG. 6 is a block diagram of an example device for implementation of the exemplary transmitter/receiver of FIG. 1.

FIG. 6 is a block diagram of an example device 600 that may be used with one or more embodiments described herein, e.g., a transmitter/receiver operating in a dual-polarized orthogonal polarization forward-scatter as shown in FIG. 1 above. The device 600 may comprise one or more network interfaces 610 (e.g., wired, wireless, etc.), at least one processor 620, and a memory 640 interconnected by a system bus 650, as well as a power supply 660. The network interface(s) 610 contain the signaling circuitry for communicating data to/from the device 600. The network interfaces may be configured to transmit and/or receive data using a variety of different communication protocols. The memory 640 comprises a plurality of storage locations that are addressable by the processor 620 and the network interfaces 610 for storing software programs and data associated with the embodiments described herein. The processor 620 may comprise hardware elements/logic adapted to execute the software programs and manipulate the data 645. An operating system 642, portions of which are typically resident in memory 640 and executed by the processor, functionally organizes the device by invoking operations in support of software processes and/or services executing on the device. These software processes and/or services may comprise transmitter process 644, receiver process 648, etc., as described above. It will be apparent to those skilled in the art that other processor and memory types, including various computer-readable media, may be used to store and execute program instructions pertaining to the techniques described herein. Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

What is claimed is:

1. A transmitter/receiver transmitter-receiver apparatus, comprising:
   a transmitter including,
   data sources for generating one or two forward-error corrected coded data signals for transmission in one or more transmission modes with variable code rates and modulation orders, wherein the one or more transmission modes are selected from the group consisting of dual transmission of two independent coded data signals, diversity transmission of one coded data signal, and combinations thereof, wherein the one or more transmission modes are chosen based on one or more measured parameters;
   a constellation modulator and framer, operating at a modulation-symbol rate, for multiplexing each coded data signal with an associated reference signal to produce one or more reference subframes and one or more data subframes and constellation modulating the reference and data subframes to produce one or more transmission frame signals;
   a radio transmission interface that in the dual transmission mode converts the one or more transmission frame signals into two independent transmission signals and in the diversity mode converts the one or more transmission frame signals into two identical transmission signals, wherein the two transmission signals are used for radio transmission from orthogonally-polarized antenna ports over a forward-scatter fading channel; and
   a receiver including,
   a radio reception interface that converts two remote-link received radio signals each associated with an orthogonal-polarized antenna port into polarization-port received signals at an integer multiple, greater than one, of the modulation-symbol rate to provide polarization-port received samples, within a reference subframe and within the one or more data subframes;
   a channel estimator for calculating, in the reference subframe, a polarization port matched-channel filter, which results from a set of equations derived by a Least-Means Squared Error optimization that depends on an orthonormal vector of basis functions, the respective reference signal and the respective polarization-port received samples;
   a channel matched filter for convolving the polarization-port received samples and the respective matched-channel filter to provide channel-matched samples;
   a down-sampler for down-sampling the channel-matched samples by the integer multiple to produce channel-matched symbols;
   an equalizer calculator for computing, in the reference subframe, an equalizer weight vector, which results from a set of equations derived by a Least-Means Squared Error optimization that depends on an orthonormal vector of basis functions, the respective reference signal, and the channel-matched symbols;
   an equalizer for processing the equalizer weight vector and the channel-matched symbols to produce equalizer estimates of a forward-error corrected coded data signal sent from a remote radio terminal; and
   a quality estimator for computing from the equalizer estimates a quality measure, that is related to signal-to-noise ratio, and the quality measure is provided to the transmitter for communications feedback to the remote terminal.

2. The transmitter-receiver apparatus of claim 1, wherein the measured parameters are selected from the group consisting of a quality measure provided by communications feedback from the remote radio terminal, a polarization correlation value, a multipath channel width that are calculated in the channel estimator, and combinations thereof.

3. The transmitter-receiver apparatus of claim 1, wherein the basis functions in the channel estimator are fast-Fourier transforms of elements of a tapped-delay line filter with tap spacing equal to the period of the reciprocal of the integer multiple of the modulation-symbol rate.

4. The transmitter-receiver apparatus of claim 1, wherein the equalizer calculator computes an outer-product matrix of the channel matched symbols.

5. A communication method, comprising:
   source generating, at a transmitter, two forward-error corrected coded data signals for transmission in one or more transmission modes with variable code rates and modulation orders, wherein the one or more transmission modes are selected from the group consisting of dual transmission of two independent coded data signals, diversity transmission of one coded data signal, and combinations thereof, wherein the one or more transmission modes are chosen based on one or more measured parameters;
   at the transmitter, constellation modulating and framing, at a modulation-symbol rate, to multiplex each coded data signal with an associated reference signal to produce one or more reference subframes and one or more data subframes and constellation modulating the reference and data subframes to produce one or more transmission frame signals;
   radio transmission converting, at the transmitter, the one or more transmission frame signals in the dual transmission mode into two independent transmission signals and the one or more transmission frame signals in the diversity mode into two identical transmission signals, and transmitting the two transmission signals from orthogonally-polarized antenna ports over a forward-scatter fading channel;
   radio reception converting, at a receiver, two remote-link received radio signals each associated with an orthogonal-polarized antenna port into polarization-port received signals to provide polarization-port received samples within a reference subframe and within the one or more data subframes;
   channel estimating, at the receiver, in the reference subframe, a polarization-port matched-channel filter, which results from a set of equations derived by a Least-Means Squared Error optimization that depends on an orthonormal vector of basis functions, the respective reference signal, and the respective polarization-port received samples;
   convolving, at the receiver, the polarization-port received samples with the respective polarization-port matched-channel filter to provide channel-matched samples:
   down-sampling, at the receiver, the channel-matched samples to produce channel-matched symbols:
   equalizer calculating, at the receiver, in the reference subframe, an equalizer weight vector, which results from a set of equations derived by a Least-Means Squared Error optimization that depends on an orthonormal vector of basis functions, the respective reference data, and the channel-matched symbols;
   processing, at the receiver, the equalizer weight vector and the channel-matched symbols to produce equalizer estimates of a forward-error corrected coded data signal sent from a remote radio terminal:

quality estimating, at the receiver, a quality measure related to signal-to-noise ratio from the equalizer estimates and providing the quality measure to the transmitter for communications feedback to the remote terminal.

6. The method of claim 5 wherein the one or more measured parameters are selected from the group consisting of a quality measure provided by communications feedback from the remote radio terminal, a polarization correlation value, a multipath channel width that are calculated in the channel estimator, and combinations thereof.

7. The method of claim 5 wherein the basis functions in the channel estimating step are fast-Fourier transforms of elements of a tapped-delay line filter with tap spacing equal to an integer multiple, greater than one, of the period of the reciprocal of the modulation-symbol rate.

8. The method of claim 5 wherein the equalizer calculating step further includes computing an outer-product matrix of the demodulated symbols.

9. The transmitter-receiver apparatus of claim 1, wherein the receiver is located in a housing unit that is separate from the transmitter and the receiver is coupled to the transmitter via a bi-directional data link.

* * * * *